United States Patent
Burke (10) Patent No.: US 6,473,737 B2
(45) Date of Patent: Oct. 29, 2002

(54) SYSTEM, METHOD AND APPARATUS FOR PROVIDING AN EXECUTIVE COMPENSATION SYSTEM

(76) Inventor: Thomas W. Burke, 6935 Hillwood Cir., Dallas, TX (US) 75248

( * ) Notice: Subject to any disclaimer, the term of this patent is extended or adjusted under 35 U.S.C. 154(b) by 0 days.

(21) Appl. No.: 09/167,633

(22) Filed: Oct. 6, 1998

(65) Prior Publication Data

US 2001/0011223 A1 Aug. 2, 2001

(51) Int. Cl.⁷ .............................................. G06F 17/60
(52) U.S. Cl. .................................................. 705/4; 705/1
(58) Field of Search ................................. 705/35, 4, 36, 705/1

(56) References Cited

U.S. PATENT DOCUMENTS

| | | | |
|---|---|---|---|
| 4,750,121 A | | 6/1988 | Halley et al. ............... 705/35 |
| 4,969,094 A | * | 11/1990 | Halley et al. ............... 705/36 |
| 4,975,840 A | | 12/1990 | DeTore et al. ............... 705/4 |
| 5,206,803 A | | 4/1993 | Vitagliano et al. ............ 705/39 |
| 5,429,506 A | * | 7/1995 | Brophy et al. ............... 434/107 |
| 5,590,037 A | | 12/1996 | Ryan et al. .................. 705/4 |
| 5,774,880 A | | 6/1998 | Ginsberg ..................... 705/36 |
| 5,775,734 A | | 7/1998 | George, Jr. .................. 283/57 |
| 5,802,500 A | * | 9/1998 | Ryan et al. ................... 705/36 |
| 5,802,501 A | * | 9/1998 | Graff .......................... 705/36 |
| 5,893,071 A | * | 4/1999 | Cooperstein ................. 705/4 |
| 5,926,800 A | * | 7/1999 | Baronowski et al. ......... 705/35 |
| 5,930,760 A | * | 7/1999 | Anderton et al. ............ 705/4 |
| 5,933,815 A | * | 8/1999 | Golden ........................ 705/35 |
| 5,966,693 A | * | 10/1999 | Burgess ....................... 705/4 |
| 5,991,744 A | * | 11/1999 | DiCresce ..................... 705/36 |
| 5,999,917 A | * | 12/1999 | Facciani et al. ............. 705/36 |

OTHER PUBLICATIONS

Pollan, Stephen M. and Levine, Mark, Die Broke, Harper-Business, New York, 1997, pp 141–143.*

* cited by examiner

Primary Examiner—Sam Rimell
(74) Attorney, Agent, or Firm—Daniel J. Chalker; Sanford E. Warren, Jr.; Gardere Wynne Sewell LLP (57) ABSTRACT

The present invention provides a system, method and apparatus for providing an executive compensation system having a first entity, a money lender, and an insurer. The first entity receives a taxable sum of money from a second entity, which owes the taxable sum of money to a person. The first entity provides one or more periodic payments to the person until the person dies, wherein the one or more periodic payments determined from the taxable sum of money and the person's life expectancy. The money lender loans a non-taxable sum of money to the person and in return receives one or more periodic interest payments from the person. The non-taxable sum of money is determined from a fixed rate of interest and the one or more periodic interest payments that are substantially equivalent to the one or more periodic payments. The insurer provides a life insurance policy for the person's life such that the life insurance policy pays a death benefit substantially equivalent to the non-taxable sum of money.

17 Claims, 6 Drawing Sheets

SYSTEM, METHOD AND APPARATUS FOR PROVIDING AN EXECUTIVE COMPENSATION SYSTEM

FIELD OF THE INVENTION

The present invention relates generally to pension plans, and more particularly to a system, method and apparatus for providing an executive compensation system

BACKGROUND OF THE INVENTION

Without limiting the scope of the present invention, this background of the invention is described in connection with executive compensation systems, which may include compensation paid to owners of privately held businesses for the sale of those businesses. The present invention, however, is not limited to compensation systems for executives, and is applicable to compensation systems for one or more individuals.

Executive compensation systems, such as pension plans, 401(k) plans, non-qualified deferred compensation agreements and stock option plans, can easily be combined to provide a retiring executive, officer or director with a "pension plan" having a value of two to three million dollars or more. The taxes on such a "pension plan" can be staggering, especially if the "pension plan" is to be paid in a "lump sum."

Similarly, owners of privately held businesses often want or must sell their business when they retire. Although an owner may have various other sources of retirement income, the owner's main source of retirement income typically comes from the sale of the business. Such a sale may result in an unacceptably high tax bill. As a result, the owner will typically demand a higher price for the business to offset the taxes that must be paid.

SUMMARY OF THE INVENTION

The present invention provides an executive compensation system having a first entity, a money lender, and an insurer. The first entity receives a taxable sum of money from a second entity, which owes the taxable sum of money to a person. The first entity provides one or more periodic payments to the person until the person dies, wherein the one or more periodic payments determined from the taxable sum of money and the person's life expectancy. The money lender loans a non-taxable sum of money to the person and in return receives one or more periodic interest payments from the person. The non-taxable sum of money is determined from a fixed rate of interest and the one or more periodic interest payments that are substantially equivalent to the one or more periodic payments. The insurer provides a life insurance policy for the person's life such that the life insurance policy pays a death benefit substantially equivalent to the non-taxable sum of money.

In another embodiment, the executive compensation system provides an annuity provider, a money lender and an insurer. The annuity provider receives a taxable sum of money from a business, which owes the taxable sum of money to a person. The annuity provider then provides one or more periodic payments to the person until the person dies, wherein the one or more periodic payments are determined from the taxable sum of money and the person's life expectancy. The money lender loans a non-taxable sum of money to the person and in return, receives one or more periodic interest payments from the person. The non-taxable sum of money is determined from a fixed rate of interest and the one or more periodic interest payments that are substantially equivalent to the one or more periodic payments. The insurer provides a life insurance policy for the person's life having one or more insurance premiums that are paid by the business such that the life insurance policy pays a death benefit substantially equivalent to the non-taxable sum of money.

In another embodiment of the present invention, the executive compensation system provides a charitable remainder trust, a money lender and an insurer. The charitable remainder trust receive a taxable sum of money from a buyer, which owes the taxable sum of money to a person. The charitable remainder trust then provides one or more periodic payments to the person until the person dies, wherein the one or more periodic payments determined from the taxable sum of money and the person's life expectancy. The money lender loans a non-taxable sum of money to the person and in return, receives one or more periodic interest payments from the person, such that the non-taxable sum of money is determined from a fixed rate of interest and the one or more periodic interest payments that are substantially equivalent to the one or more periodic payments. The insurer provides a life insurance policy for the person's life such that the life insurance policy pays a death benefit substantially equivalent to the non-taxable sum of money.

The present invention also provides a method for providing an executive compensation system comprising the steps of determining one or more periodic payments from a taxable sum of money, which is owed to a person by a second entity, and the person's life expectancy. The non-taxable sum of money is then determined from a fixed rate of interest and one or more periodic interest payments that are substantially equivalent to the one or more periodic payments. Next, a life insurance policy is obtained for the person's life, the life insurance policy having a death benefit that is substantially equivalent to the non-taxable sum of money. Thereafter, the taxable sum of money is transferred from the second entity to a first entity, the non-taxable sum of money is transferred from a money lender to the person and the one or more periodic payments are periodically transferred from the first entity to the person and the one or more periodic interest payments are periodically transferred from the person to the money lender. The death benefit is finally used to substantially repay the money lender for the non-taxable sum of money after the person's death.

In addition, the present invention provides a computer program embodied on a computer-readable medium for defining an executive compensation system. The computer program comprises code segments for determining: (1) a projected net income payment from an investment; (2) a loan amount based on an interest rate and an interest payment such that the interest payment is equal to or less than the projected net income payment; (3) a premium for a life insurance policy such that the life insurance policy provides a death benefit equal to or greater than the loan amount; and (4) a projected income from investing the loan amount.

Other features and advantages of the present invention shall be apparent to those of ordinary skill in the art upon reference to the following detailed description taken in conjunction with the accompanying drawings.

BRIEF DESCRIPTION OF THE DRAWINGS

The above and further advantages of the present invention may be better understood by referring to the following detailed description in conjunction with the accompanying drawings, in which.

DETAILED DESCRIPTION OF THE INVENTION

Figure 1A:
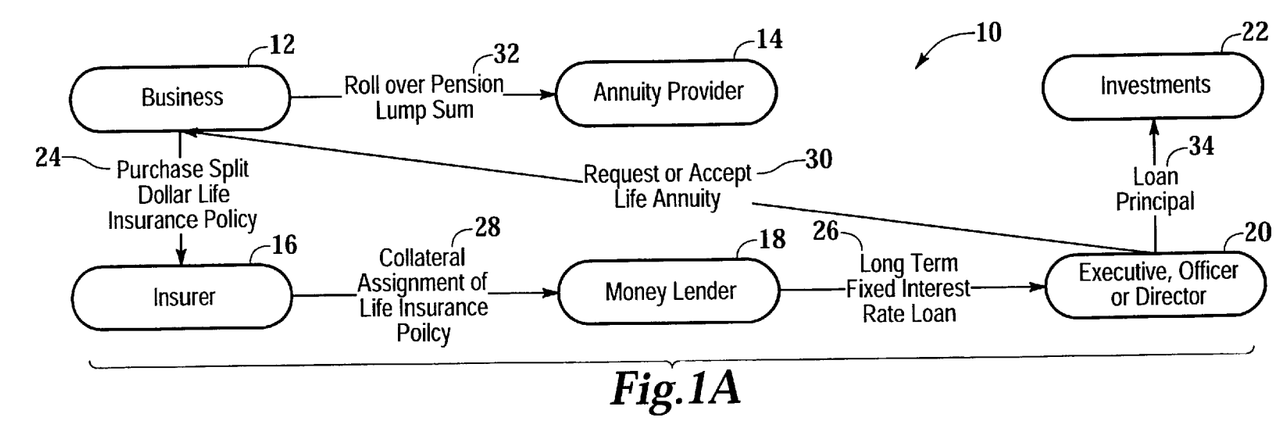
FIG. 1A is a flow chart illustrating the functions provided by the various entities during the setup of an executive compensation system for an executive, officer or director of a business in accordance with a preferred embodiment of the present invention.

Referring to FIG. 1A, a flow chart illustrating the functions provided by the various entities during the setup of an executive compensation system for an executive, officer or director of a business, in accordance with a preferred embodiment of the present invention, is designated generally by the numeral 10. The setup of the executive benefits system 10 involves a business 12, an annuity provider 14, an insurer 16, a money lender 18, an executive, officer, director 20 or any other person that the business 12 desires to provide the executive benefits system to, and one or more investments 22.

During system setup 10, and as shown by line 30, the executive, officer or director 20 either accepts a defined benefit plan that provides annuity payments or instructs the administrator of the business' 401(k) or pension plan to purchase a life annuity using some or all of the executive's 401(k) balance or pension. In the case of a defined benefit plan, such as a non-qualified deferred compensation plan, the business 12 offers a deal including the purchase of a life annuity as an payment option which is then accepted by the executive, officer or director 20. The business then purchases a life annuity 32 from the annuity provider 14. In the case of a defined contribution plan, such as a pension plan or a 401(k) plan, the business 12 takes the value of those benefits and purchases a life annuity 32 from the annuity provider 14. In either case, the corporation 12 purchases a split dollar life insurance policy 24 on the executive, officer or director 20 from the insurer 16.

The amount of coverage supplied by the split dollar life insurance policy 24, is set up to provide a death benefit substantially equivalent to the amount of the loan 26 provided by the money lender 18. The loan 26 typically has a term of 30 to 40 years or until the executive, officer or director 20 dies, and is preferably based on a fixed interest rate. The money lender 18 receives a collateral assignment 28 of the life insurance policy to secure repayment of the loan 26. The executive, officer or director 20 then invests the loan principal 34 in one or more investments 22.

Figure 1B:
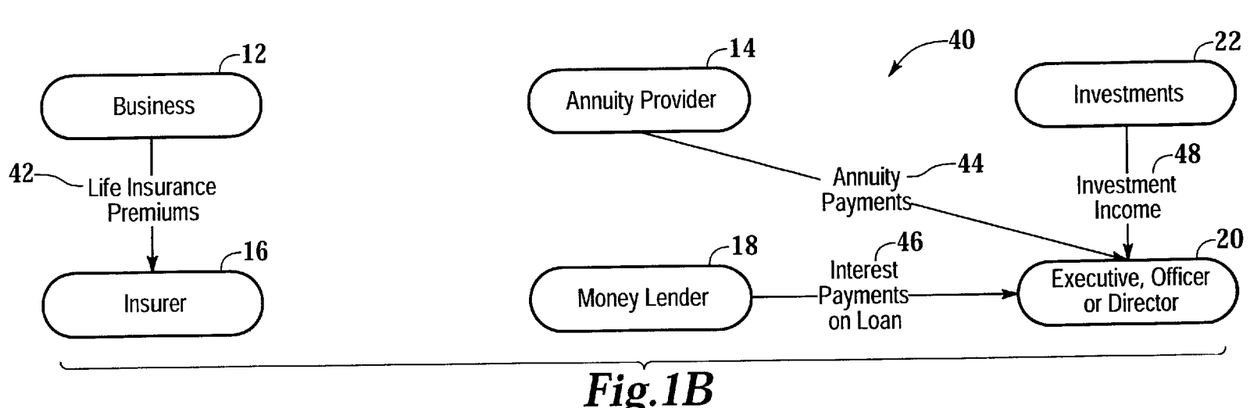
FIG. 1B is a flow chart illustrating the functions provided by the various entities during the operation of the executive compensation system for an executive, officer or director of a business in accordance with a preferred embodiment of the present invention.

Now referring to FIG. 1B, a flow chart illustrating the functions provided by the various entities during the operation of the executive compensation system for an executive, officer or director of a business, in accordance with a preferred embodiment of the present invention, is designated generally by the numeral 40. Throughout the system operation, the business 12 pays the life insurance premiums 42 to the insurer 16. Typically, this is highly desirable to the business 12 because the life insurance premiums 42 impact corporate earnings considerably less than other forms of executive compensation plans, such as non-qualified deferred compensation or stock options. As a result, the "bottom line" or profit of the business 12 is improved. The executive, officer or director 20 then receives periodic annuity payments 44 from the annuity provider 14 and uses those payments 44 to pay the periodic interest payments 46 to the money lender 18. The executive, officer or director 20 also receives investment income 48 from the one or more investments 22.

Figure 1C:
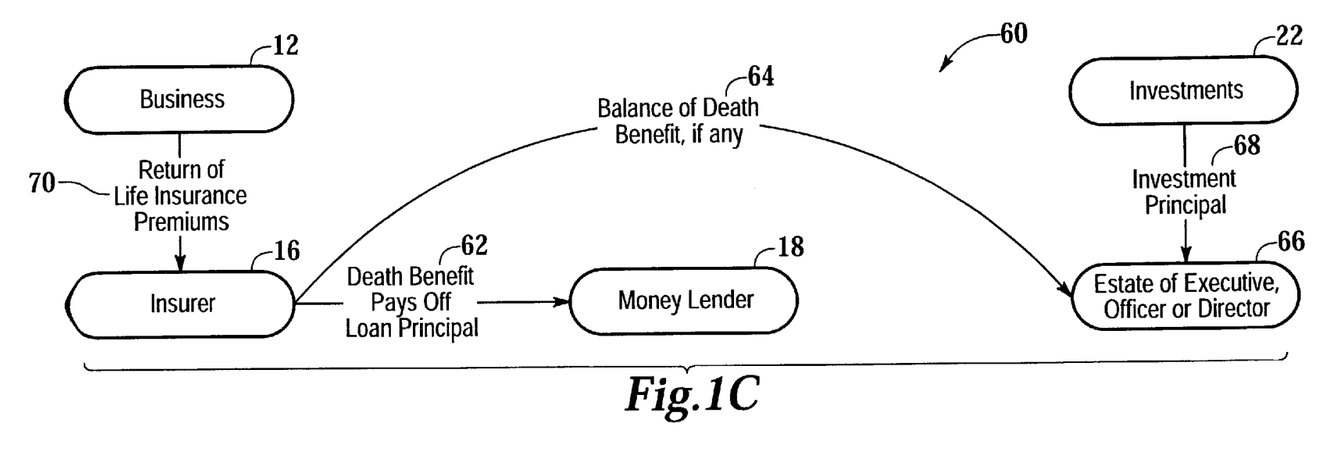
FIG. 1C is a flow chart illustrating the functions provided by the various entities during the termination of the executive compensation system for an executive, officer or director of a business in accordance with a preferred embodiment of the present invention.

Referring now to FIG. 1C, a flow chart illustrating the functions provided by the various entities during the termination of the executive compensation system for an executive, officer or director of a business, in accordance with a preferred embodiment of the present invention, is designated generally by the numeral 60. At system termination 60, which typically occurs after the death of the executive, officer or director 20 (FIGS. 1A and 1B), the insurer 16 pays off the loan to the money lender 18 using the death benefits under the life insurance policy 62. The insurer 16 also pays the balance of the death benefits under the life insurance policy 64, if any, to the estate of the executive, officer or director 66. In addition, the insurer 16 returns the life insurance premiums 70 to the business 12. This is a benefit of purchasing a split dollar life insurance policy. Lastly, the estate of the executive, officer or director 66 also receives the investment principal 68 from the one or more investments 22.

For example, an executive is expected to retire at age 65 and have a projected 401(k) balance of $2,500,000. At retirement, the executive may choose to receive his or her 401(k) balance as a lump sum of $1,500,000 (assuming federal income taxes of 40% or $1,000,000), or roll the 401(k) balance into an Individual Retirement Account ("IRA") and receive $150,000 per year (assuming a 10% rate of return and federal income taxes of 40% or $100,000). Under the executive compensation system of the present invention, the executive can exchange his or her 401(k) balance of $2,500,000 for a life annuity that pays $230,140 per year for life. The annuity income may then be used to pay the 8% interest on a loan of $2,876,750. The interest payments are then tax deductible as long as the executive has investment income equal to or greater than the interest payments. Thus there is no net taxable income from the 401(k) benefits and the loan. Accordingly, the executive has transformed a taxable 401(k) benefit into a tax-free lump sum account balance of $2,876,750. Assuming that the executive invests all of the loan amount at a net after tax return of 8%, the executive receives a net income of $230,140 for life. Then upon the death of the executive, the life insurance policy pays off the loan balance, and the executive's estate still has the originally invested loan balance plus any remaining balance from the life insurance policy. A comparison of the two plans shows an increase in annual income of 153% and a future value of benefits received of 166% at age 85.

Figure 2A:
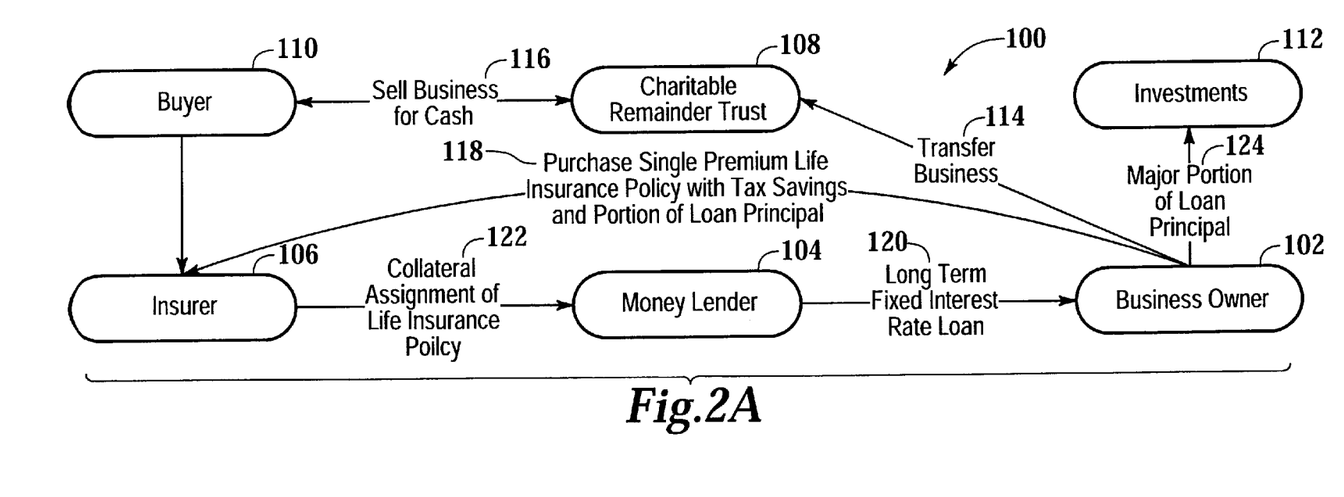
FIG. 2A is a flow chart illustrating the functions provided by the various entities during the setup of the executive compensation system for an owner of a business that is being sold in accordance with another embodiment of the present invention.
Figure 2B:
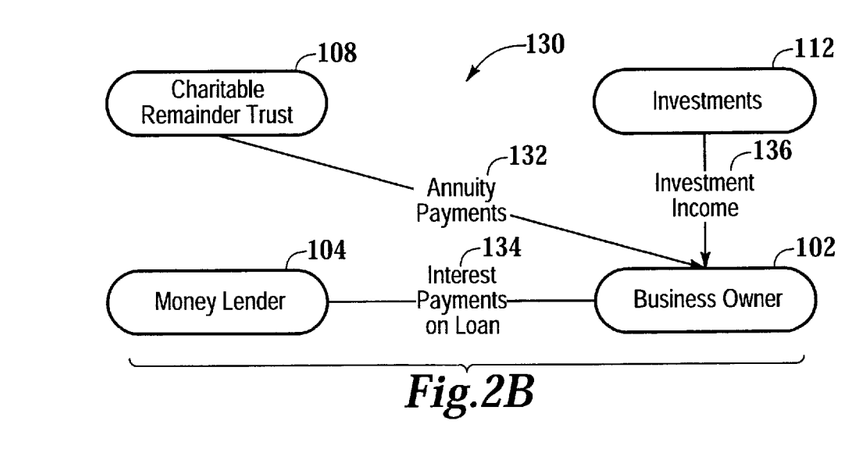
FIG. 2B is a flow chart illustrating the functions provided by the various entities during the operation of the executive compensation system for the owner of a business that is being sold in accordance with another embodiment of the present invention.

Referring to FIG. 2A, a flow chart illustrating the functions provided by the various entities during the setup of the executive compensation system for an owner of a business that is being sold, in accordance with another embodiment of the present invention, is designated generally by the numeral 100. The setup of the executive compensation system 100 involves a business owner 102 of a business, a money lender 104, an insurer 106, a charitable remainder trust 108, a buyer 110 and one or more investments 112. The buyer 110 wants to purchase the business from the business owner 102, but normally must pay more for the business to make up for the capital gains taxes that the business owner 102 must pay as a result of the sale. The present invention thus reduces the cost to the buyer 110 while simultaneously increasing the after tax value of the sale to the business owner 102. The business owner 102 transfers the business 114 to a charitable remainder trust 108 in return for guaranteed periodic annuity payments for life 132 (FIG. 2B). The charitable remainder trust 108 then sells the business for cash 116 to the buyer 110. The sale of the business 116 by the charitable remainder trust 108 is tax exempt.

Figure 2C:
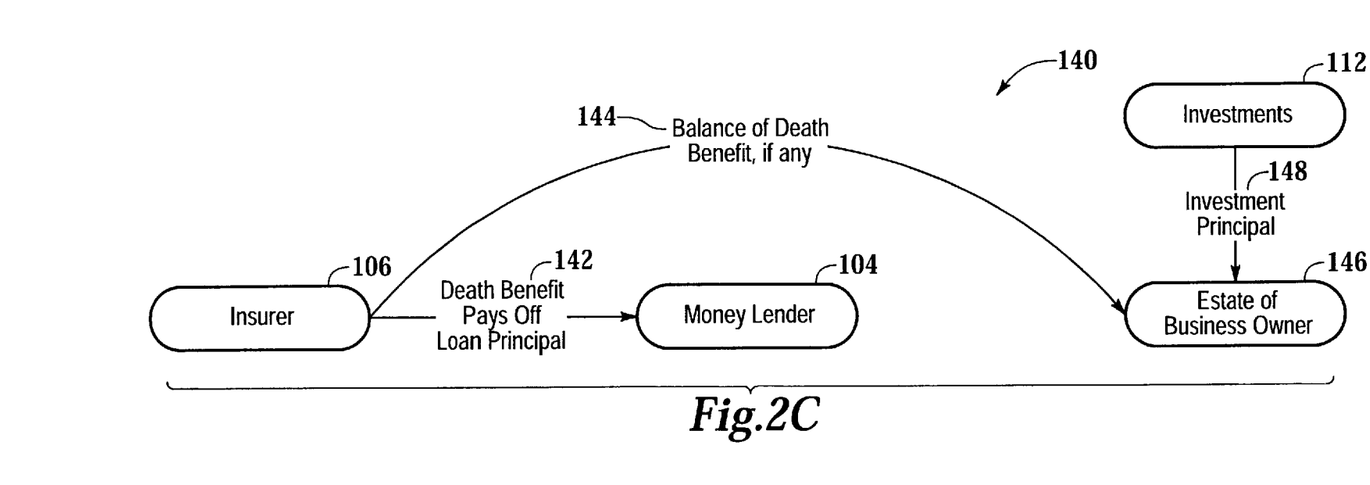
FIG. 2C is a flow chart illustrating the functions provided by the various entities during the termination of the executive compensation system for the owner of a business that is being sold in accordance with another embodiment of the present invention.

The business owner 102 purchases a single premium life insurance policy 118 from the insurer 106 using tax savings and a portion of the loan 120. The money lender 104 provides the business owner 102 with the loan 120. The amount of the loan 120 is calculated based on the annuity payments 132 (FIG. 2B) and the fixed interest rate of the loan 120 such that the annuity payments 132 (FIG. 2B) are substantially equivalent to the interest payments 134 (FIG. 2). In addition, the loan 120 typically has a term of 30 to 40 years or until the business owner 102 dies. A long term fixed interest rate loan is preferred because the executive compensation system does not have to address problematic contingencies, such as the loan being called prematurely or fluctuations in interest rates that would result in a shortage or surplus of annuity income to pay loan interest. The amount of coverage supplied by the single premium life insurance policy 118 is set up to provide a death benefit substantially equivalent to the amount of the loan 120 provided by the money lender 104. The money lender 104 receives a collateral assignment 122 of the life insurance policy to secure repayment of the loan 120. The business owner then invests a major portion of the loan principal 124 in one or more investments 112.

Now referring to FIG. 2B, a flow chart illustrating the functions provided by the various entities during the operation of the executive compensation system for an owner of a business that is being sold, in accordance with a preferred embodiment of the present invention, is designated generally by the numeral 130. Throughout the system operation, the business owner 102 receives periodic annuity payments 132 from the charitable remainder trust 108 and uses those payments 132 to pay the periodic interest payments 134 to the money lender 104. The business owner 102 also receives investment income 136 from the one or more investments 112.

Referring now to FIG. 1C, a flow chart illustrating the functions provided by the various entities during the termination of the executive compensation system for an owner of a business that is being sold, in accordance with a preferred embodiment of the present invention, is designated generally by the numeral 140. At system termination 140, which typically occurs after the death of the business owner 102 (FIGS. 1A and to 1B), the insurer 106 pays off the loan principal to the money lender 104 using the death benefits under the life insurance policy 142. The insurer 106 also pays the balance of the death benefits under the life insurance policy 144, if any, to the estate of the business owner 146. Lastly, the estate of the business owner 146 also receives the investment principal 148 from the one or more investments 112.

For example, a business owner can sell his or her business at age 65 for $2,500,000 which results in net after tax proceeds of $2,000,000 (assuming federal income taxes of 20% or $500,000). The business owner can then invest that money and receive $160,000 per year (assuming a 10% rate of return and federal income taxes of 20% or $40,000). Under the executive compensation system of the present invention, the business owner can set up a charitable remainder trust and transfer the business to the charitable remainder trust in return for annual payments of $225,000 per year for life. The annuity income may then be used to pay the 8% interest on a loan of $2,812,500. The interest payments are then tax deductible as long as the business owner has investment income of equal to or greater than the interest payments. Thus there is no net taxable income from the sale of the business. Accordingly, the business owner has transformed the sale of business into a tax-free lump sum account balance of $2,812,500. Assuming that the business owner invests all of the loan amount at a net after tax return of 8%, the executive receives a net income of $225,000 for life. Then upon the death of the business owner, the life insurance policy pays off the loan balance, and the business owner's estate still has the originally invested loan balance plus any remaining balance from the life insurance policy. A comparison of the two plans shows an increase in annual income of 153% and a future value of benefits received of 166% at age 85.

Figure 3A:
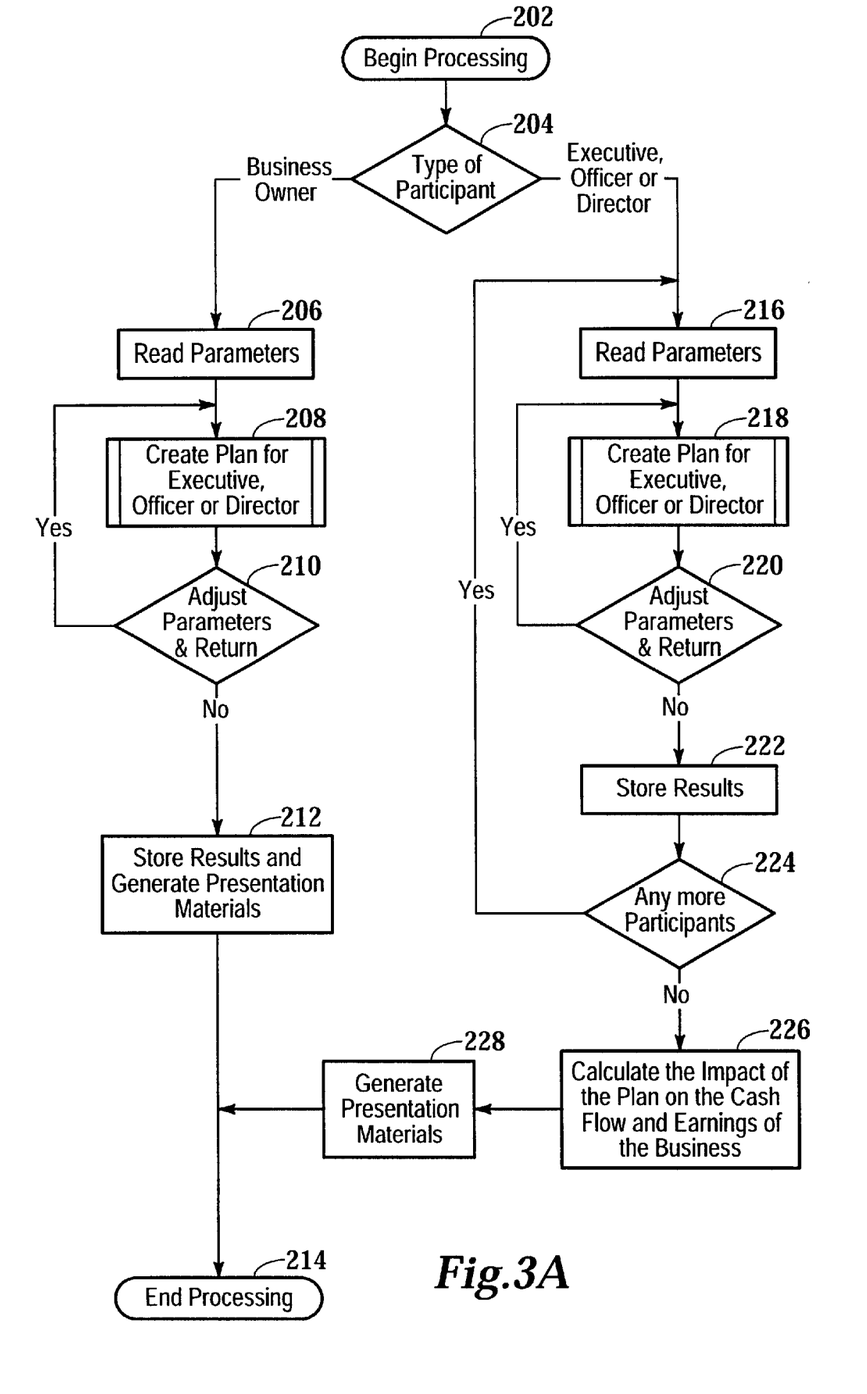
FIGS. 3A, 3B and 3C are flow charts describing the software used to define an executive benefits system in accordance with an embodiment of the present invention.
Figure 3B:
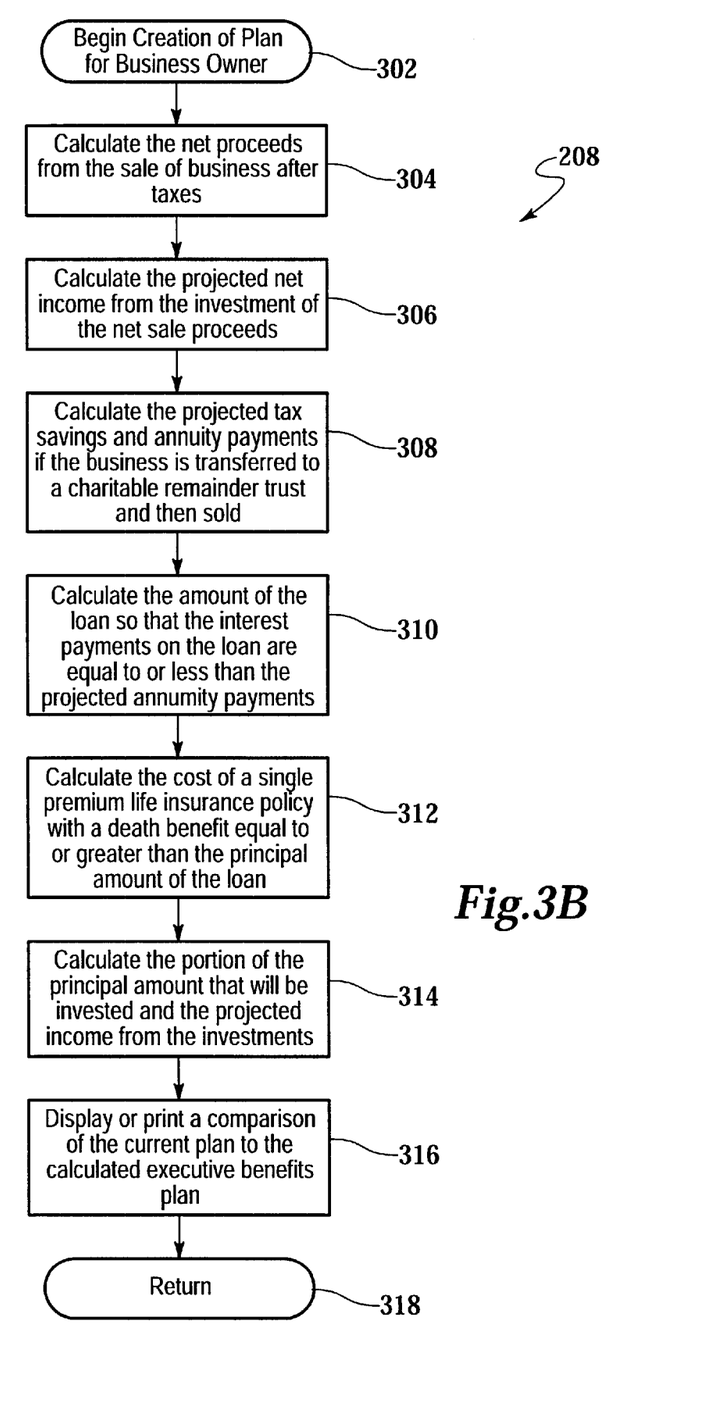
Figure 3C:
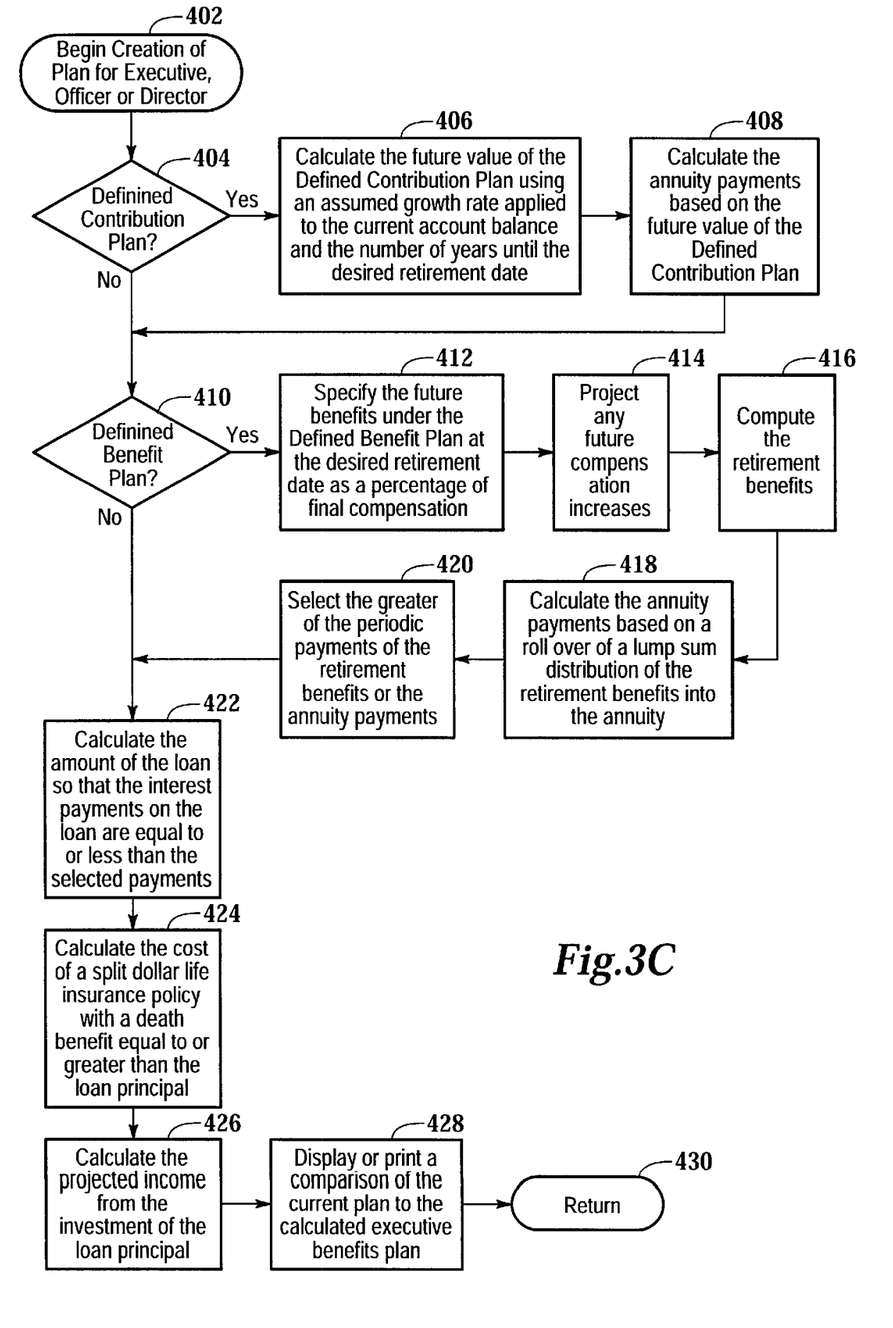

Referring to FIGS. 3A, 3B and 3C, the flow charts describing the software used to define an executive benefits system in accordance with an embodiment of the present invention are described. In FIG. 3A, processing begins in block 202 and the type of participant for which the executive benefits system is to be defined is determined in decision block 204. If the participant is a business owner, various parameters relating to the business owner are read in block 206. This data may include the business owner's current age, projected retirement age, details relating to the sale of the business and the business owner's finances and investment portfolio, taxes, projected interest rates, insurance rates, investment growth rates, etc. A executive compensation system is then created for the business owner in block 208, which is further described in reference to FIG. 3B. If the user desires to adjust any of the parameters and run a new plan, as determined in decision block 210, the changes are made and processing returns to block 208 to create a new plan. If, however, the uses does not want to adjust any of the parameters, the results of the plan are stored and presentation materials are generated in block 212. Processing then ends in block 214.

If, however, the type of participant is an executive, officer or director, as determined in decision block 204, various parameters relating to the executive, officer or director are read in block 216. This data may include the executive, officer or director's current age, projected retirement age, details relating to the executive's finances and investment portfolio, taxes, projected interest rates, insurance rates, investment growth rates, etc. A executive compensation system is then created for the executive, officer or director in block 218, which is further described in reference to FIG. 3C. If the user desires to adjust any of the parameters and run a new plan, as determined in decision block 220, the changes are made and processing returns to block 218 to create a new plan. If, however, the uses does not want to adjust any of the parameters, the results of the plan are stored in block 222. If there are any more participants in the plan, such as the remaining executives in the business, as determined in decision block 224, processing returns to block 216 where the process repeats until a plan has been generated for all participants. If, however, a plan has been generated for all participants, the impact of the plan on the cash flow and earnings of the business are calculated in block 226. Presentation materials are then generated in block 228 and processing ends in block 214.

In FIG. 3B, the process of creating a plan for a business owner begins in block 302. The net proceeds from the sale of the business, after taxes, are calculated in block 304. The projected net income from the investment of the net sale proceeds is calculated in block 306. The projected tax savings and annuity payments are calculated if the business is transferred to a charitable remainder trust and subsequently sold in block 308. The amount of the loan is calculated so that the interest payments on the loan are equal to or less than the projected annuity payments in block 310. The cost of a single premium life insurance policy is calculated with a death benefit equal to or greater than the principal amount of the loan in block 312. The portion of the loan principal that will be invested is calculated, along with the projected income from the investments in block 314. A comparison of the current plan to the calculated executive benefits plan is displayed or printed in block 318. Thereafter, processing returns to the main program in block 318.

In FIG. 3C, the process of creating a plan for an executive, officer or director begins in block 402. If the executive has a defined contribution plan, as determined in decision block 404, the future value of the defined contribution plan is calculated using an assumed growth rate applied to the current account balance and the number of years until the desired retirement date in block 406. The annuity payments are then calculated based on the future value of the defined contribution plan in block 408. Thereafter or if the executive did not have a defined contribution plan, as determined in decision block 404, the program determines whether the executive has a defined benefit plan in decision block 410. If the executive has a defined benefit plan, the future benefits under the defined benefit plan are specified at the desired retirement date as a percentage of final compensation in block 412. The executive's future compensation increases, if any, are projected in block 414 and the executive's retirement benefits are calculated in block 416. The annuity payments are calculated based on a roll over of a lump sum distribution of the retirement benefits into the annuity in block 418. Next, the greater of the periodic payments of the retirement benefits or the annuity payments are selected in block 420. In other words, the actuaries that calculate the annuity purchase rates for a given business' pension plan may use more conservative factors than those that are currently used by insurance companies. If so, the software will use the factors that provide more income to the executive.

Thereafter, or if the executive does not have a defined benefit plan, as determined in block 410, the amount of the loan is calculated so that the interest payments on the loan are equal to or less than the selected payments in block 422. The cost of a split dollar life insurance policy with a death benefit equal to or greater than the loan principal is calculated in block 424. The life insurance amount consists of several components: the amount of the loan; the corporation's piece of the split dollar plan that returns to the corporation; the cumulative premiums that have been paid; and the amount reserved to provide a cost of money factor to the corporation for the use of money. These calculations may be performed by the software or by separate insurance company software, but the amounts are checked and the earnings impact and cumulative cash flow impact is modeled for the corporate buyer by software. The projected income from the investment of the loan principal is calculated in block 426. A comparison of the current plan to the calculated executive benefits plan is displayed or printed in block 428. Thereafter, processing returns to the main program in block 430.

One objective of the present invention is for the interest paid on the loan to be deductible for federal income tax purposes. There is, however, a provision of the tax code that eliminates itemized deductions by 3% of the amount by which a taxpayers adjusted gross income exceeds a threshold amount (currently $124,500 on joint returns). The software analyzes the reduction in the amount of itemized deductions that can be claimed. This is done by using the retirement income from the Current Plan with that of the new plan to see if there is a loss of tax deductibility. For this purpose certain assumptions are used about other income and federal a state income tax rates.

Although preferred embodiments of the invention have been described in detail, it will be understood by those skilled in the art that various modifications can be made therein without departing from the spirit and scope of the invention as set forth in the appended claims.

What is claimed is:

1. A computer program embodied on a computer-readable medium for defining an executive compensation system, the computer program comprising:

a code segment for determining a projected periodic net income payment from a taxable lump sum investment;

a code segment for determining a loan amount based on a fixed interest rate and a periodic interest payment such that the periodic interest payment is equal to or less than the projected periodic net income payment;

a code segment for determining a premium for a life insurance policy such that the life insurance policy provides a death benefit equal to or greater than the loan amount and the projected periodic net income payment is not derived from the life insurance policy; and a code segment for determining a projected income from investing the loan amount.

2. The computer program embodied on a computer-readable medium for defining an executive compensation system, as recited in claim 1, wherein the investment is a defined contribution plan.

3. The computer program embodied on a computer-readable medium for defining an executive compensation system, as recited in claim 1, wherein the investment is a defined benefit plan.

4. The computer program embodied on a computer-readable medium for defining an executive compensation system, as recited in claim 1, wherein the investment is a taxable transfer of a business.

5. The computer program embodied on a computer-readable medium for defining an executive compensation system, as recited in claim 1, further comprising a code segment for generating a summary illustrating the benefits of the executive compensation system.

6. The computer program embodied on a computer-readable medium for defining an executive compensation system, as recited in claim 1, further comprising a code segment for determining an economic impact of the executive compensation system on a business.

7. The computer program embodied on a computer-readable medium for defining an executive compensation system, as recited in claim 1, further comprising a code segment for generating one or more presentation aids.

8. A computer program embodied on a computer-readable medium for defining am executive compensation system, the computer program comprising:
   a code segment for determining a projected periodic net income payment from a taxable lump sum investment;
   a code segment for determining a loan amount based on a fixed interest rate and a periodic interest payment such that the periodic interest payment is equal to or less than the projected periodic net income payment; and
   a code segment for determining a premium for a life insurance policy such that the life insurance policy provides a death benefit equal to or greater than the loan amount and the projected periodic net income payment is not derived from the life insurance policy.

9. A computer program embodied on a computer-readable medium for defining an executive compensation system, the computer program comprising:
   a code segment for determining one or more periodic payments from a taxable lump sum of money and a person's life expectancy, wherein a second entity owes the taxable lump sum of money to a person and transfers the taxable lump sum of money to a first entity, and the first entity transfers the one or more periodic payments to the person;
   a code segment for determining a non-taxable loaned sum of money from a fixed interest rate and one or more periodic interest payments that are substantially equivalent to the one or more periodic payments, wherein the non-taxable sum of money is transferred from a money lender to the person, and the person transfers the one or more periodic interest payments to the lender;
   a code segment for determining a premium for a life insurance policy for the person's life such that the life insurance policy provides a death benefit equal to or greater than the non-taxable sum of money, and wherein the one or more periodic payments are not derived from the life insurance policy and the death benefit is used to substantially repay the money lender for the non-taxable sum of money after the person's death.

10. The computer program as recited in claim 9, wherein the second entity is a business.

11. The computer program as recited in claim 9, wherein the taxable lump sum of money comprises a pension.

12. The computer program as recited in claim 9, wherein the taxable lump sum of money comprises the person's share of a 401(k) plan.

13. The computer program as recited in claim 9, wherein the taxable lump sum of money comprises an amount from a sale of a business.

14. The computer program as recited in claim 9, wherein the first entity is a charitable remainder trust.

15. The computer program as recited in claim 9, wherein the first entity is an annuity provider.

16. The computer program as recited in claim 9, wherein the person pays the premium associated with the life insurance policy.

17. The computer program as recited in claim 9, wherein the second entity pays the premium associated with the life insurance policy.

* * * * *